United States Patent [19]

Fukinuki et al.

[11] 3,973,079
[45] Aug. 3, 1976

[54] TWO-LEVEL PICTURE SIGNAL TRANSMISSION SYSTEM

[75] Inventors: Takahiko Fukinuki, Kokubunji; Yoshizumi Eto, Sagamihara, both of Japan

[73] Assignees: Hitachi, Ltd.; Hitachi Electronics, Ltd., both of Japan

[22] Filed: Dec. 9, 1974

[21] Appl. No.: 531,173

[30] Foreign Application Priority Data
Dec. 12, 1973 Japan.............................. 48-137728
Dec. 12, 1973 Japan.............................. 48-137729
Dec. 12, 1973 Japan.............................. 48-137730

[52] U.S. Cl.................................... 178/6; 178/67; 178/68; 178/DIG. 3; 325/30; 325/38 A
[51] Int. Cl.²............................................ H04L 27/20
[58] Field of Search ....... 178/67, 6; 325/30, DIG. 3, 325/68, 38 A

[56] References Cited
UNITED STATES PATENTS
3,436,474 4/1969 Seeger .................................. 178/7.1
3,747,024 7/1973 Choquet ............................. 325/163
3,818,135 6/1974 Tannhauser .......................... 178/67

Primary Examiner—Robert L. Griffin
Assistant Examiner—Edward L. Coles
Attorney, Agent, or Firm—Craig & Antonelli

[57] ABSTRACT

In a transmission system in which two-level picture signal is divided into blocks, each having a predetermined number of picture elements, the pieces of signal contained in the respective blocks are converted to a predetermined number of codes, and the codes are converted to modulated signals having different levels or phase, the modulator circuit is so designed that any two modulated signals causing the shifting of the contour of picture may be converted to two signals having adjacent levels or phases, so as to minimize the degradation of the quality of the reproduced picture due to code errors caused during transmission.

8 Claims, 14 Drawing Figures

TWO-LEVEL PICTURE SIGNAL TRANSMISSION SYSTEM

BACKGROUND OF THE INVENTION

1. Field of the Invention

The present invention relates to a system for transmitting two-level picture signals and more particularly to a system such as facsimile transmission, in which picture signal consisting of low and high, i.e. black and white, levels is divided into blocks, each having a predetermined number of picture elements, the pieces of the signals contained in the respective blocks are converted to the corresponding binary codes, and the binary codes are converted to the corresponding signals having different phases or amplitudes.

2. Description of the Prior Art

With a system for transmitting two-level signal, such as facsimile system, the most important things are to decrease the degradation of the quality of the reproduced picture due to code errors during transmission, to increase the speed of transmission and to simplify the structure of the system. As one of the systems for transmitting coded two-level signal is known the run length coding system. In this system, the information of run lengths, i.e. the lengths of continuing white or black (i.e. high or low) levels, is coded to be transmitted. This system has an advantage that the transmission time can be economized, but also has a disadvantage that once a code error is caused the quality of the reproduced picture is so much degraded.

Moreover, a direct transmission system is known in which the two-level signal is transmitted directly through a modulator and a demodulator (referred to also as MODEM) without coding. With this system, even if the transmission error rate is about $10^{-3}$, the quality of the reproduced picture is allowable in practice, since the picture signal such as facsimile signal, used in this system has a high redundancy. However, this system has a comparatively long transmission time and in order to increase the transmission speed of the MODEM, i.e. bit rate, an expensive device must be employed.

In these systems described above, i.e. the phase shift keying modulation (a kind of phase modulation) system or the multi-level modulation (a kind of amplitude modulation), the two-level signal is divided into blocks each containing a predetermined number of successive picture elements, the pieces of the signal contained in the respective blocks are coded, and the coded signals are converted into the corresponding signals having a predetermined number of different phases or amplitudes. With this known system, however, certain code errors during transmission will still cause a considerable degradation of the quality of the reproduced picture.

SUMMARY OF THE INVENTION

The main object of the present invention is to provide a system for transmission through coding of two-level picture signals, which system is much more improved than the conventional one and in which the code errors, even if the probability of the occurrence of code errors is the same, hardly affect the quality of the reproduced picture adversely.

According to the present invention, which has been made to attain the above mentioned object, there is provided a system for transmitting two-level picture signals in which the two-level picture signal obtained by scanning the picture to be transmitted is divided into blocks each containing a predetermined number of picture elements; the pieces of the signal contained in the blocks are converted to a predetermined number of codes each of which consists of a predetermined number of bits; the codes are converted to the corresponding transmission signals having predetermined phases or amplitudes; and at the receiving end the original picture is reproduced by a process opposite to that taken at the transmitting end, characterized in that the code signals are so related to the transmission signals that, of all the code signals, those which mainly concern the continuous shift of contour of the picture to be transmitted may be converted to transmission signals having adjacent phases, frequencies or amplitudes.

In a system in which a picture signal is divided into blocks, in which the pieces of signal in the blocks are converted to a predetermined number of code signals, and in which the codes are converted to the corresponding transmission signals, the most frequent error is the one in which a code having one phase, frequency or level is erroneously changed to other codes having the adjacent phases, frequency or levels.

According to the system embodying the present invention, since of all the code signals those which mainly concern the continuous shift of the contour of the original picture are converted to the transmission signals having adjacent phases, frequency or amplitudes, the code errors, even if caused during transmission, will appear as very slight change in the contour of the reproduced picture. And these infinitesimal change in the contour is not perceptible by human eyes so that the quality of the reproduced picture is hardly effected adversely.

DESCRIPTION OF THE PREFERRED EMBODIMENTS

For the better understanding of the present invention, the general structure of a system for transmitting two-level picture signals will first be described.

Figures 1, 2:
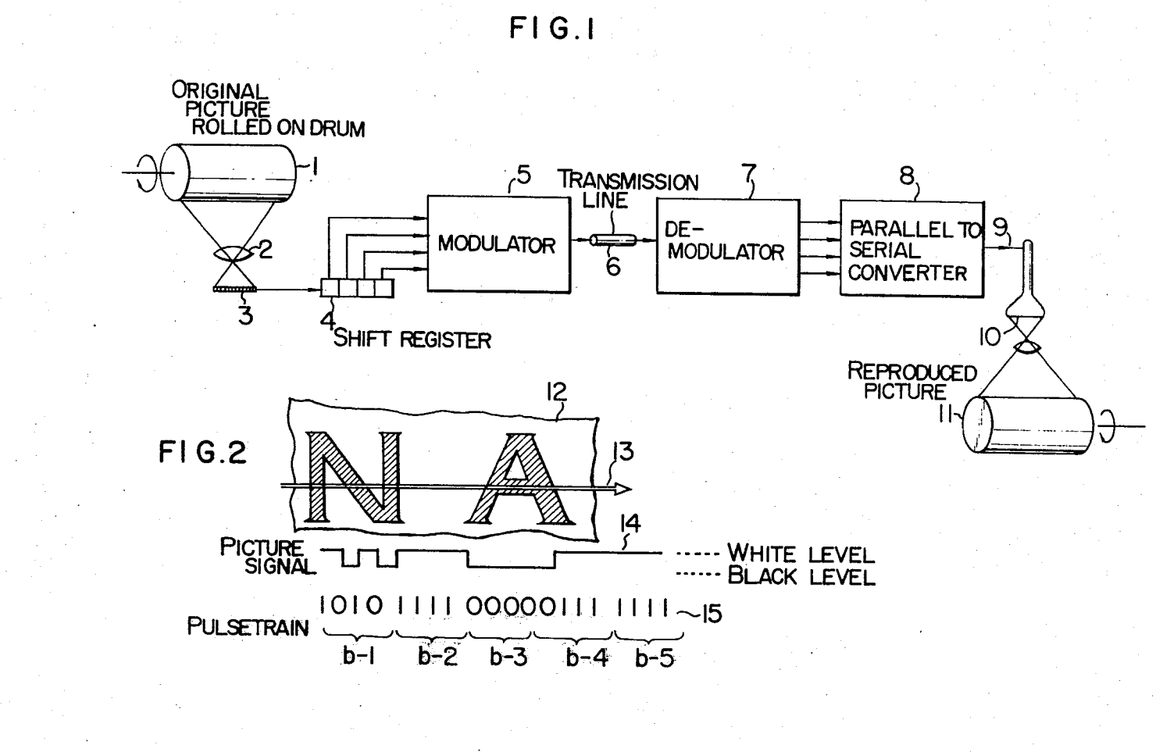
FIG. 1 schematically shows a system as a whole, for transmitting two-level picture signal, embodying the present invention.
FIG. 2 illustrates how the two level picture signal is converted to pulse train.

As seen in FIG. 1, the image of the original picture such as printed matter, photograph or map, attached onto a rotating drum 1 is formed through a lens 2 on a photosensor 3 to be transduced into an electrical signal. The electrical signal has two levels corresponding to the brightness of the original picture and is converted to a train of succesive pulses representing the succesive picture elements of the original picture. The train of pulses are grouped through a shift register 4 into blocks each having a predetermined number of bits and the blocked pulses are fed to a modulator 5. The modulator 5 converts the codes in the blocks, i.e. binary numbers, to a predetermined number of transmission signals having different conditions. The output of the modulator 5 is fed to the receiving end through a transmission line 6. At the receiving end, the received signal is converted in a well-known manner to a parallel code signal. The parallel code signal is converted through a parallel-to-serial converter 8 to a serial signal. The serial signal is fed to an electrooptical transducer 9 and transduced there through a luminescent element 10 to a light-intensity signal. The image of the original picture can be reproduced by scanning a photosensitive paper rolled on a rotating drum 11 with the light-intensity signal.

Various kinds of modulators, e.g. a phase shift keying modulator, a multi-level modulator or the like, can be used to perform the role of the modulator 5. However, for convenience sake, the present invention will be described in the following, as applied to the case where the phase shift keying modulator is used and it is a matter of course that the present invention can also be applied without departing the scope thereof to other cases where other types of modulators are utilized.

FIG. 2 illustrates the operations of the stages before the modulator 5. When the original picture (characters NA in this case) is scanned in such a manner as indicated by an arrow 13, a two-level picture signal 14 is obtained in which the two levels correspond to the white and black parts of the original signal. The two-level picture signal is converted to a train of pulses representing binary digits 0 and 1. The train of pulses are grouped every four bits into blocks b − 1, b − 2, . . . , b − 5, . . . . Here, each bit corresponds to one picture element and the binary number in each block is defined as one code. Accordingly, if each block is constituted of four bits, 16 (= $2^4$) different codes can be formed.

In the modulator 5, on the other hand, 16 sinusoidal signal sources are provided which respectively generate sinusoidal signals having a frequency and different phases, the phases differing only by a constant (e.g. $2\pi/16$) from one another. The 16 sinusoidal signals are allotted respectively to the 16 different codes and the sinusoidal signals are sent onto the transmission line 6 in accordance with the corresponding codes applied to the modulator 5.

Figure 3:
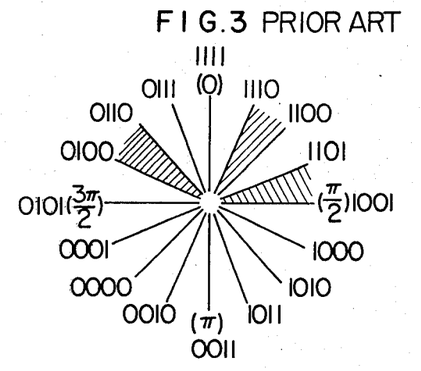
FIG. 3 and FIG. 5B show the relationship between the codes and the transmission signals, used in a conventional transmission system.

In such a conventional transmission system as described above, the relationship between the codes and the phases (or amplitudes) of the transmitted signals is in accord with the Gray code shown in FIG. 3. As apparent from FIG. 3, the feature of the Gray code is that any two codes corresponding to the adjacent phases differ only in one bit. Accordingly, even if a code is mistaken for an adjacent one by the demodulator 7 due to noise introduced during transmission, the resulting code error influences only one picture element. The single error is not always negligible, however, since the erroneous picture element may produce a remarkable contrast. For example, provided that the code (0000) is mistaken for the code (0010), then a white dot appears in the black area so that the undesirable visual effect due to the erroneous picture element in this case cannot be neglected. On the other hand, in case where the code (1110) is erroneously changed to the code (1100), only the shift of the contour of the picture from white to black by an amount corresponding to a single picture element takes place so that the change in the contour in this case is hardly perceptible.

Figure 4A:
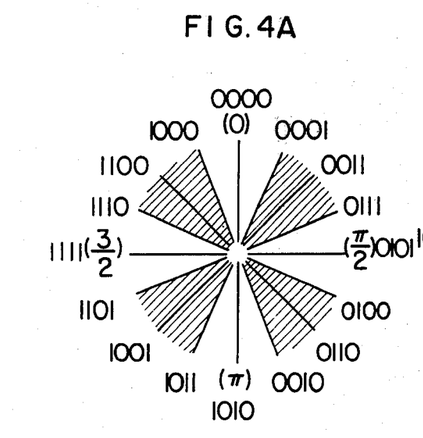
FIGS. 4A, 4B, 5A, 8, 9 and 10 show the relationships between the codes and the transmission signals, used in the transmission system according to the present invention.
Figure 4B:
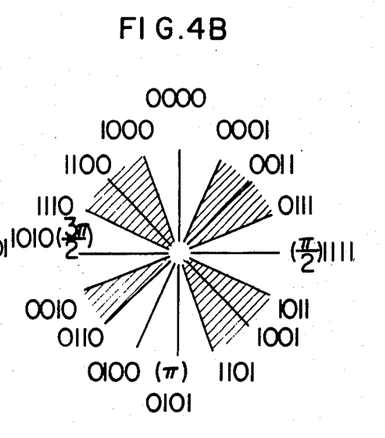

The present invention has been made on the basis of the principle described above. FIGS. 4A and 4B show the relationships between the codes and the phases of the transmission signals, used in the system for transmitting two-level picture signals. In this specification, description is made only of the most practical case where the code per block consists of four bits, but it will be needless to say that the present invention can also be applied to other cases where each code is constituted of more or less than 4 bits.

As apparent from FIGS. 4A and 4B, according to the present invention, of all the codes in blocks corresponding to the different combinations of picture elements, those concerning the shift of the contour of picture are allotted to the transmission signals having adjacent phases which have the greatest probability of occurrence of code error. Namely, as the shaded portions in FIG. 4A or 4B indicate, the codes (0001), (0011) and (0111) which cause the continuous shift of contour of picture, are converted respectively to the transmission signals having phases $2\pi/16$, $2.(2\pi/16)$ and $3.(2\pi/16)$ differing by a constant of $2\pi/16$ radians.

Now, a clear definition of the contour shifting code, i.e. code concerning the continuous shifting of the contour of picture, should here be given with the aid of a concrete example. According to the definition used here, the codes (0001) and (0011) are said to be contour shifting codes with respect to each other. Namely, the first and the fourth bits from right, of the codes (0001) and (0011) are identical with each other, that is, 1 and 0, while the second bit of the code (0001) is different from that of the code (0011). That is, concerning the codes (0001) and (0011), the variable, i.e. the second bits 0 in (0001) and 1 in (0011) may be changed to each other. In other words, the change of the second bit in this case makes merely the shift of contour and causes little degradation of picture quality. In this way, each of the pairs (0011) and (0111), (0100) and (0110), (0110) and (0010), (1011) and (1001), (1001), and (1101), (1000) and (1100), and (1100) and (1110) are said to be contour shifting codes with respect to each other. As seen from FIGS. 4A and 4B, there are 8 combinations of contour shifting codes out of 16 different codes so that 8 kinds of code errors can be reduced to negligible shifts of contour. On the other hand, as the shading in FIG. 3 indicates, the Gray code, which is used in the conventional MODEM has only three pairs of such contour shifting codes. This means the superiority of the present method.

In the foregoing description, 4 picture elements are contained in a single block and 16 different codes are formed, but this means in no sense that the number of picture elements contained in each block is limited to four. If more than 4 picture elements are included in a single block, the number of the codes formed is greater and the structures of the modulator and the demodulator are more complicated, but more of the code errors caused during transmission can be reduced to imperceptible shift of contour. On the other hand, if less than 4 picture elements are contained in a block, the structures of the modulator and the demodulator are more simplified at the sacrifice of the ability to reduce the code errors.

Figure 5A:
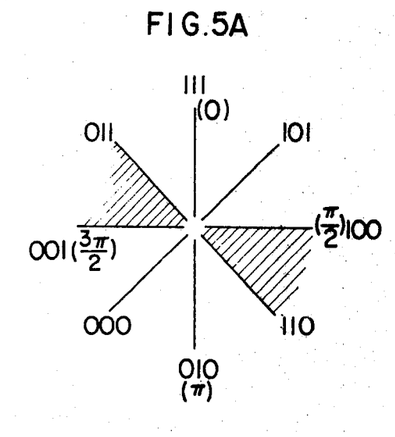
Figure 5B:
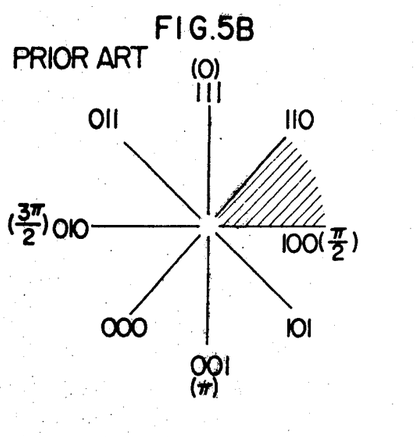

FIGS. 5A and 5B correspond respectively to the case where each block consists of 3 picture elements and the codes are converted to the corresponding transmission signals according to the present invention and the case where each block has 3 picture elements and the codes are converted according to Gray's method. It is seen from these figures that more code errors can be reduced to contour shifting codes according to the present invention than according to the conventional coding method.

Figure 6:
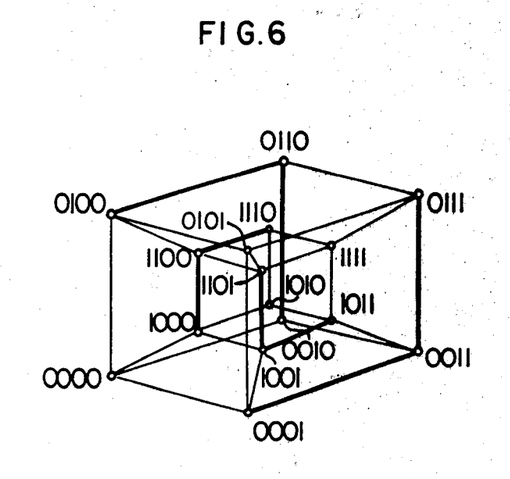
FIGS. 6 and 7 are diagrams useful to determine the arrangement of the codes used in the present invention.
Figure 7:
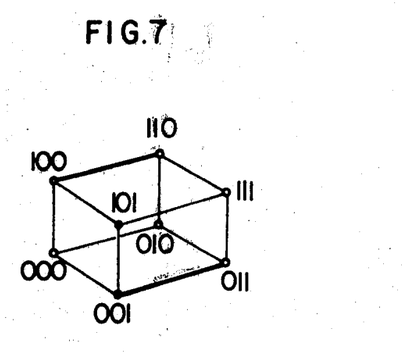

FIG. 6 shows in a stereographic manner the interrelationships between the 16 codes each of which consists of 4 picture elements and FIG. 7 depicts the equivalent in case where each code consists of three picture elements. Every line segment in these pictures connects a pair of codes which differ from each other only in one bit. Especially, every thick segment connects a pair of contour shifting codes. Accordingly, the sequence of the codes as shown in FIGS. 4A and 4B is so determined as to pass, only once, through all the points, all the thick lines and thin lines, if necessary.

In the above embodiments, every pair of the contour shifting codes is allotted to the transmission signals having adjacent phases which have the greatest probability of occurrence of code errors and therefore the degradation of the quality of the reproduced picture due to the error can be remarkably reduced.

Moreover, by varying the relationship between the codes and the phases of the transmission signals as mentioned above the structure of the system can be further simplified than that of the run-length coding system and the transmission speed can be greater than that of the conventional direct transmission, though the quality of the reproduced picture is degraded to a slight extent in this case. In general, the probability that a transmission signal having a certain phase is mistaken in the demodulator for another transmission signal having an adjacent phase owing to the noise generated during transmission, increases with the number of the different phases allotted to the distinct transmission signals. The inventor's calculation has revealed, that the signal to noise ratio (S/N) of the transmission line, corresponding to a certain code error rate is lower by about 6dB in a system with 8 phases than in a system with 16 phases. In other words, with a transmission line having a certain S/N, the error rate is hundreds to thousands of times greater, depending on S/N, in a system with 16 phases than in a system with 8 phases.

Figure 8:
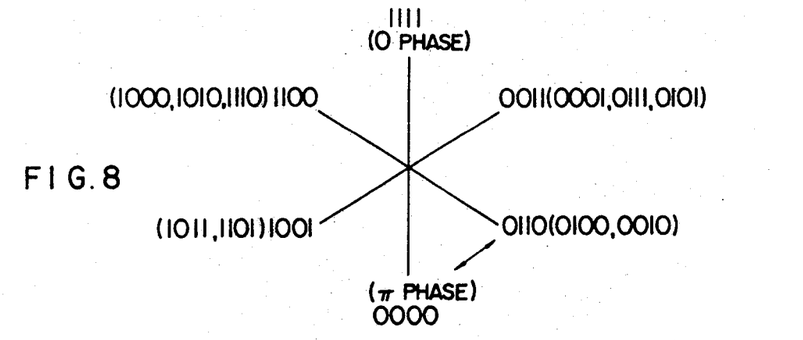

FIG. 8 shows the relationship between the codes and the phases of the transmission signals, used in a two-level picture signal transmission system as another embodiment of the present invention. In this embodiment, each block corresponds to one code consisting of 4 bits and the 16 different codes are allotted to 6 transmission signals having 6 distinct phases. Namely, of all the 16 different codes the 14 codes, except the codes (1111) and (0000), are grouped into 4 sets and each set consists of contour shifting codes or of contour shifting codes and another code having a small probability of occurrence. The four sets of codes and the two independent codes (1111) and (0000) are allotted to the 6 transmission signals having different phases. The concrete grouping is as follows.

| code (a) | 0001 } | |
| code (b) | 0111 } | 0011 |
| code (c) | 0101 } | |
| code (d) | 0100 } | 0110 |
| code (e) | 0010 } | |
| code (f) | 1011 } | 1001 |
| code (g) | 1101 } | |
| code (h) | 1000 } | |
| code (i) | 1010 } | 1100 |
| code (j) | 1110 } | |

The codes (a), (b), (c) and the code (0011) are represented by and converted to the code (0011); the codes (d), (e) and the code (0110) are represented by and converted to the code (0110); the codes (f), (g) and the codes (1001) are represented by and converted to the code (1001); and the codes (h), (i), (j) and the code (1100) are represented by and converted to the code (1100). Accordingly, at the receiving end only the six codes, i.e. the representative codes and the independent codes (1111) and (0000), are received. The conversions of the codes (a) and (b) to the code (0011), the codes (d) and (e) to the code (0110), the codes (f) and (g) to the code (1001), and the codes (h) and (j) to the code (1100), cause only slight shifts of the contour of the reproduced picture, as described above, so that the picture quality of the copy is hardly degraded. The conversions of the codes (c) and (i) respectively to the codes (0011) and (1100) cause a fine line segment or dot representing a picture element to vanish, but the codes (c) and (i) have the smallest probability of occurrence so that their influence on the picture quality is very scarce. By the use of this conversion, the structure of the whole system is simplified and the transmission speed is improved, though the picture quality is sacrificed to a certain degree.

Figure 9:
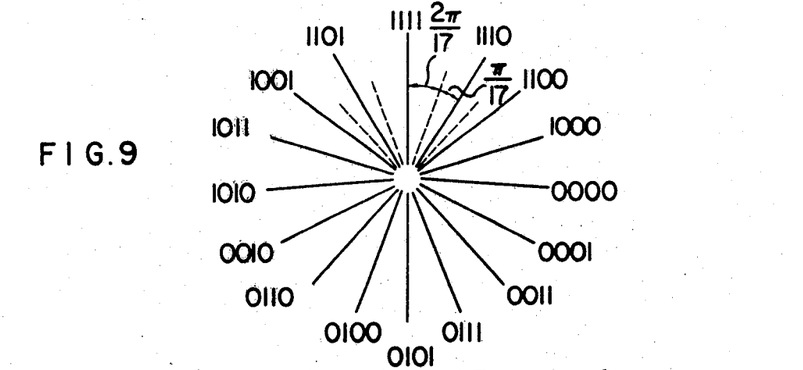
Figure 10:
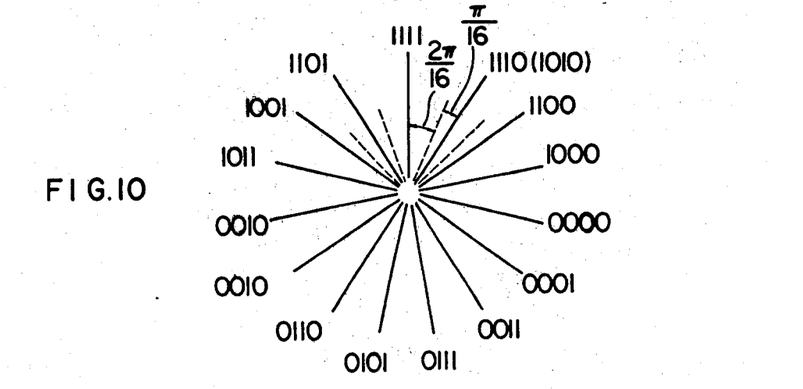

FIGS. 9 and 10 show the relationships between the codes and the phases of the transmission signals, used in other embodiments of the present invention. These embodiments are improvements on the ones which have the relationships between the codes and the phases of the transmission signals, as shown in FIGS. 4A and 4B. In the embodiments associated with FIGS. 4A and 4B, the codes are allotted to the transmission signals having different phases separated from one another by the same interval while in these embodiments the code having a large probability of occurrence is provided with a wider range of phases to decrease the code error rate. As described above with reference to FIG. 8, since the code errors is caused by the erroneous discriminations between the adjacent phases due to the noise generated during transmission, the probability of occurrence of the code errors can be decreased by increasing the spacings between the adjacent phases.

The inventor has investigated into the probability of occurrence of such four bit codes as described above, using typewritten English letters as samples. The result is as follows.

| | Probability |
|---|---|
| (1111) | 0.95 |
| (0000), (0001), (0011), (0111), (1110), (1100), (1000), (1011), (1001). (1101) | 0.005 |
| (0100), (0110), (0010) | 0.001 |

-continued

| | Probability |
|---|---|
| (0101),(1010) | 0.0001 |

A similar tendency can be found in ordinary printed matters with alphabet. Accordingly, if the code (1111) having the greatest probability of occurrence is prevented from being erroneously changed to another code, the probability of occurrence of code errors is at most 0.05 at the receiving end. In FIG. 9, $2\pi$ radians is divided into 17 equal angles and the code (1111) (white level) is provided with twice an angle covering a code other than the code (1111). Thus, the code (1111) has a phase difference of $1.5 \times (2\pi/17)$ with respect to the adjacent codes while other codes except the code (1111) has a phase difference of $2\pi/17$ with respect to the adjacent codes. If the range for the discrimination of the respective phases is set as indicated by dotted radial lines in FIG. 9, a code having a phase within a range of $\pm 2\pi/17$ is identified to be the code (1111) and, for example, a code having a phase within a range of $2\pi/17 \sim 4\pi/17$ is identified to be the code (1110). Namely, for the same code error rate the code (1111) can be lower by 6 dB in terms of S/N than the other codes. In this case, the code (1111) has a phase angle coverage larger than the other codes so that the phase intervals of the other codes are smaller than those in the cases associated with FIGS. 4A and 4B, with the result that the error rates concerning the other codes are also increased.

FIG. 10 corresponds to the case where the code (1111) has a phase interval of $3\pi/16$ with respect to the adjacent codes while the other codes have a phase interval of $2\pi/16$ with respect to the adjacent codes. In this case, the number of different phases is fifteen. Here, a code having a phase within a range of $\pm 2\pi/16$ is identified as the code (1111) and a code having a phase within a range or $2\pi/16 \sim 4\pi/16$ is identified as the code (1110). The codes (1010) and (1110) are represented in this case by the code (1110) so as to reduce 16 codes to 15 ones. This means that the code (1010) is always converted to the code (1110), that is, the picture elements of the original picture, represented by the code (1010) are reproduced as the picture elements corresponding to the code (1110). Since the code (1010) has a very small probability of occurrence as described above, the resulting degradation of the picture quality in practice is negligible.

Figure 11:
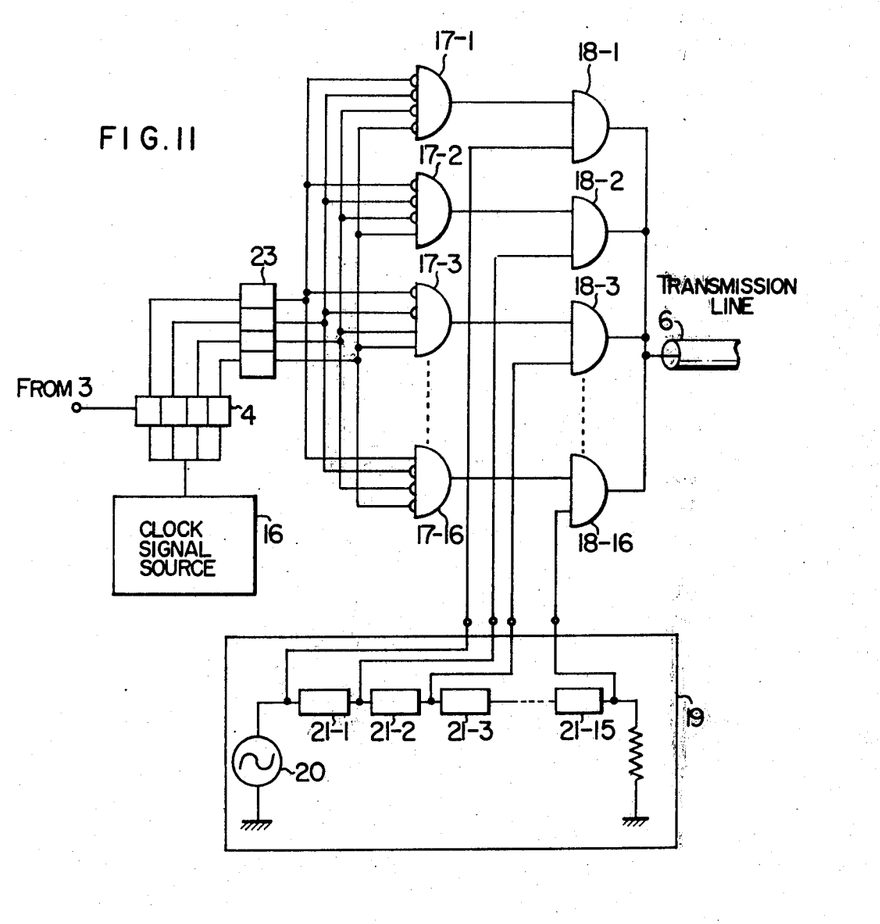
FIG. 11 is a block diagram of a modulating circuit used in the embodiment of the present invention.

FIG. 11 is a circuit of a main part of a two-level picture signal transmission system according to the present invention, the circuit including the shift register 4 and the modulator 5 shown in FIG. 1. In FIG. 11, the shift register 4 receives a train of pulses constituting the two-level picture signal and is shifted from left to right in synchronism with the clock period of the pulse train. Read clock pulses having a period equal to 4 times the clock period of the pulse train, are applied from a clock signal source 16 to the respective stages of the shift register. Each 4-bit signal read out of the shift register 4 is stored in a memory 23 until the next read signal is applied from the source 16 to the register 4. The memory 23 continues to deliver a parallel code consisting of 4 bits for a certain period. The code is then fed to 16 AND gates 17-1, 17-2, . . . , and 17-16 connected at the output side of the memory 23. These 16 AND gates correspond respectively to the 16 codes as shown in FIG. 4A. Namely, for example, the AND gate 17-1 delivers an output when the code (0000) is applied; the AND gate 17-2 delivers an output when the code (0001) is applied; the AND gate 17-3 delivers an output when the code (0011) is applied; and so forth. Each of the outputs of the AND gates 17-1 to 17-16 is applied to one of the inputs of the corresponding one of other sixteen gates 18-1 to 18-16. The other inputs of the 16 AND gates 18-1 to 18-16 receive so many signals having the same frequency and different phases separated by $2\pi/16$ from one another. A signal source 19 generates sixteen sinusoidal signals having a frequency and different phases separated by $2\pi/16$ from one another. The signal source 19 consists of a sinusoidal wave generator 20 and fifteen phase shifters 21-1 to 21-15 each of which causes a phase shift of $2\pi/16$ radians. As seen from FIG. 11, 16 sinusoidal signals can be derived from the output of the generator 20 and the respective outputs of the phase shifters 21-1 to 21-15 and these 16 sinusoidal signals are applied to the above-mentioned other inputs of the gates 18-1 to 18-16. When the memory 23 delivers an output, only one of the gates 17-1 to 17-16 delivers an output so that only one of the gates 18-1 to 18-16 delivers an output. Consequently, the 16 carrier signals having different phases are sent onto the transmission line 6 in a change-over manner in synchronism with the read clock period of the clock signal from the source 16, that is, a phase-modulated signal is transmitted through the transmission line 6. The circuit shown in FIG. 11 corresponds to the embodiment of the present invention associated with FIG. 4A. Similar circuit adapted for the embodiment associated with FIG. 9 or 10, can be obtained by modifying the circuit of FIG. 11 to a certain extent. In order to realize the circuit adapted for the embodiment associated with FIG. 9, it is only necessary to make the phase shift by the phase shifter whose output is applied to the AND gate which is opened when the code (1111) is delivered from the memory 23, greater by a desired quantity than the phase shift by the other phase shifters. For the circuit adapted for the embodiment associated with FIG. 10, it is necessary to apply to an OR gate the outputs of the two AND gates which deliver outputs in response to the codes (1010) and (1110) and to drive by the output of the OR gate and the AND gate which passes and blocks the corresponding sinusoidal signal, while the degree of the phase shift by the phase shifter whose output is applied to that AND gate which is opened in response to the code (1111) must be greater than that of the phase shifts by the other phase shifters. Further, the circuit for the embodiment associated with FIG. 8 can be realized as follows. An OR gate is provided which receives the outputs of the four AND gates which deliver their outputs respectively in response to the codes (0001), (0011), (0111) and (0101), and whose output drives the AND gate which passes and blocks the corresponding sinusoidal signal. In like manner, a second OR gate is provided for the codes (0100), (0110) and (0010); a third OR gate for the codes (1011), (1001) and (1101); and a fourth OR gate for the codes (1000), (1100), (1110) and (1010), the outputs of the OR gates driving the AND gate which pass and block the corresponding sinusoidal signals having different phases. The remaining parts of the circuit are the same as those of the circuit shown in FIG. 11. In this case, the phase shifts of the 5 phase shifters used here may be the same or varied.

It should here be noted that the circuit in FIG. 11 takes for convenience sake a most understandable form and that the circuit can be modified within the scope of the present invention.

Figure 12:
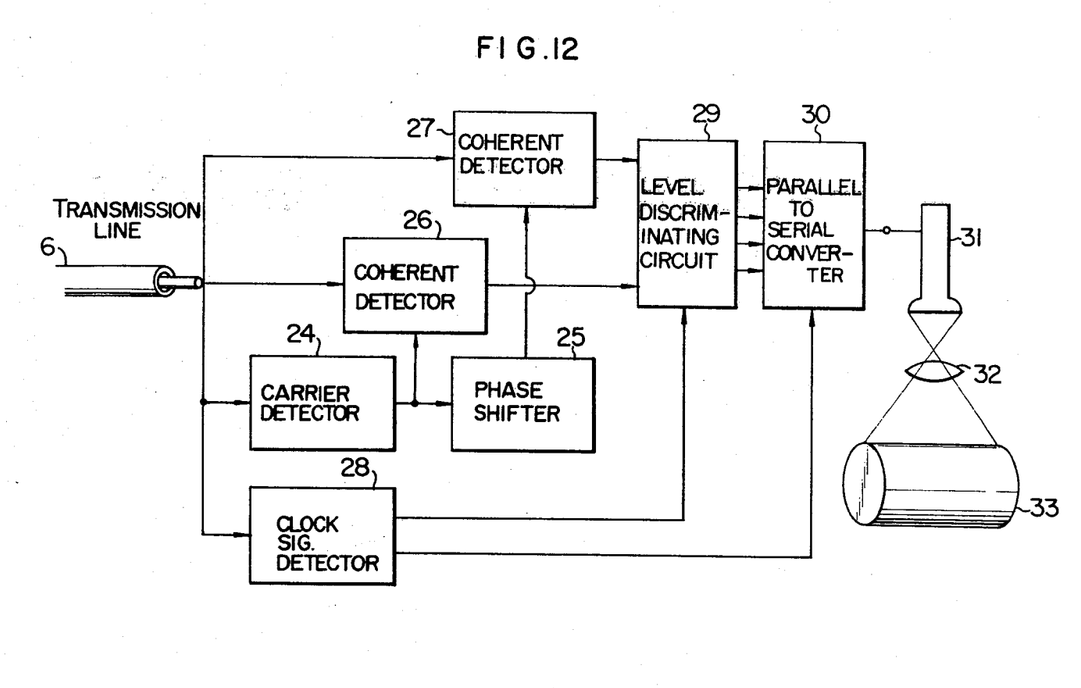
FIG. 12 is a block diagram of a receiver used in the embodiment of the present invention.

FIG. 12 shows in block diagram the receiving end equipments of a two-level picture signal transmission system according to the present invention. The structure of the circuit in FIG. 12 is almost the same in principle as that of the demodulator used in a conventional phase-modulated transmission system and only a brief description thereof will be given below. In FIG. 12, the modulated signal transmitted through the transmission line 6 to the receiving end is first applied to a carrier detector 24 to obtain a carrier having a locked phase, (i.e., a signal identical with that from the sinusoidal signal source 20). The carrier having the locked phase is used as reference carrier in the process of demodulation. The reference carrier from the carrier detector 24 is fed to a coherent detector 26 and also to another coherent detector 27 through a phase shifter 25. The coherent detectors 26 and 27 deliver outputs in proportion to the phase differences between the reference carrier and the received signals, i.e. 16 detected outputs having different levels. The modulated signal received is secondarily applied to a clock signal detector 28, which generates a first clock signal having the same period as the pulse train applied to the shift register 4 shown in FIG. 1 and a second clock signal having a period equal to 4 times the period of the first clock signal. The second clock signal and the outputs of the coherent detectors 26 and 27 are applied to a level discriminating circuit 29, which identifies the abovementioned 16 outputs in accordance with the levels of the outputs of the coherent detectors 26 and 27 and converts the 16 signals to the corresponding parallel codes. The parallel codes are transferred successively to a parallel-to-serial converter 30 in synchronism with the second clock signal. The parallel-to-serial converter 30 delivers 4 bit codes serially. The train of pulses, which coincide with those fed to the shift register 4, are converted by an electrooptical transducer 31 into a light-intensity signal which is passed through an optical device 32 and scans a photosensitive paper attached on a rotating drum 33. As a result, the image of the original picture is reproduced on the photosensitive paper.

In the previous embodiments, the phase modulation is exclusively employed, but the differential phase modulation or the multi-level modulation can also be utilized.

As described above, according to the present invention, the contour shifting codes are converted to the signals having adjacent phases so that even if a transmission signal having a certain phase is erroneously changed to another transmission signal having the adjacent phase due to noise during transmission, as occurs most often, the error will cause only a slight shift of contour of the reproduced picture corresponding to a single picture element, whereby for a certain error rate the picture quality according to the present system is much more improved than according to the conventional one.

What is claimed is:

1. A two-level picture signal transmission system comprising a means for obtaining two-level picture signal by scanning an original picture; a means for dividing said two-level picture signal into blocks each consisting of a predetermined number of picture elements and for converting the picture elements contained in said blocks to a corresponding code; a level, frequency or phase modulating circuit for performing modulation in accordance with said code; a means for transmitting the output of said modulating circuit; a demodulator for demodulating the signal received through said transmitting means into the corresponding codes; and an apparatus for reproducing the image of said original picture from the output signal of said demodulator, wherein said modulation circuit converts those codes which cause the continuous shift of the contour of picture, to the corresponding transmission signals having adjacent level, frequencies or phases.

2. A two-level picture signal transmission system as claimed in claim 1, wherein the level, frequency or phase allotted to one of said codes has a greater spacing with respect to the adjacent levels, frequencies or phases allotted to other codes than all the other spacings between those allotted to the other codes.

3. A two-level picture signal transmission system as claimed in claim 1, wherein said modulating circuit is a phase shift keying circuit.

4. A two-level picture signal transmission system as claimed in claim 1, wherein said modulating circuit is a multi-level modulating circuit.

5. A two-level picture signal transmission system comprising
   a means for generating a two-level picture signal;
   a coder for dividing said picture signal into blocks each containing a predetermined number of picture elements and for converting the picture elements contained in said blocks, to a corresponding code;
   a converting circuit for grouping said codes into plural sets each consisting of one or more codes and for converting the one or more codes belonging to each set, to a single code representative of said set;
   a level, frequency or phase modulating circuit for converting said representative codes to the corresponding signals having different levels, frequencies or phases;
   a means for transmitting the output of said modulating circuit;
   a decoder for converting the signals received from said transmitting means, to the corresponding codes; and
   an apparatus for transforming said codes from said decoder, into a picture.

6. A two-level picture signal transmission system as claimed in claim 5, wherein said converting circuit groups into a set those codes which cause the continuous shift of the contour of picture.

7. A two-level picture signal transmission system as claimed in claim 5, wherein said converting circuit not only groups into a set those codes which cause the continuous shift of the contour of picture but also causes each of codes having a large probability of occurrence to form a set.

8. A two-level picture signal transmission system as claimed in claim 7, wherein each of the codes each of which forms a set, consists of picture elements of the same level.

* * * * *